United States Patent Office 3,570,334
Patented Mar. 16, 1971

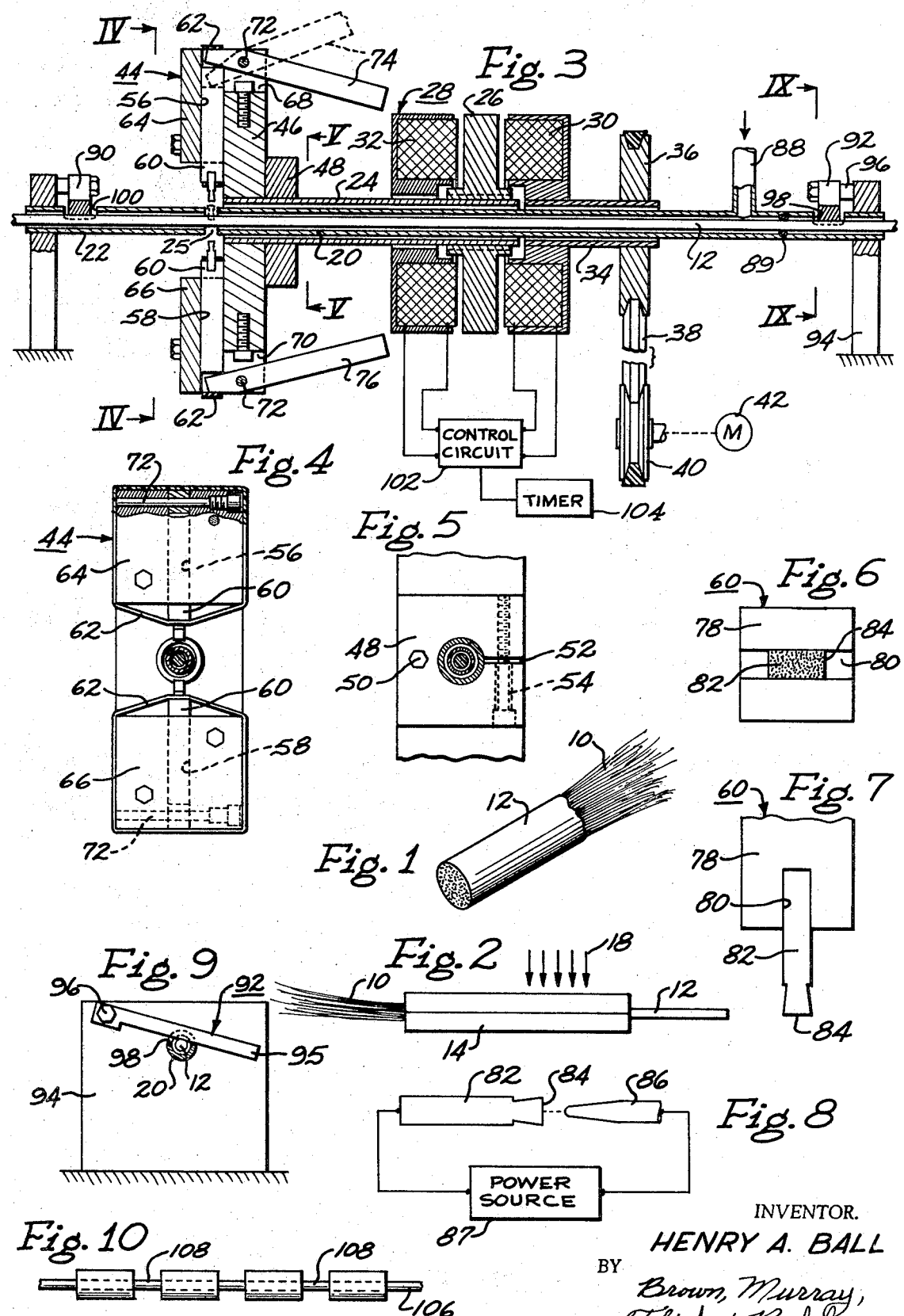

---

3,570,334
APPARATUS FOR SEVERING RESINOUS IMPREGNATED FIBER WORKPIECES
Henry A. Ball, Glenshaw, Pa., assignor to The Cleanola Company, Glenshaw, Pa.
Filed Aug. 8, 1969, Ser. No. 848,555
Int. Cl. B23b 3/06
U.S. Cl. 82—59                                             10 Claims

ABSTRACT OF THE DISCLOSURE

Described is apparatus for severing long slender workpieces formed from strands of glass fibers bonded together by a suitable resin. This is accomplished by means of one or more cutting elements which rotate around a stationary workpiece and are moved into engagement with the workpiece, preferably by centrifugal force. The cutting elements are provided with roughened, but not serrated, flat surfaces which sever the workpiece in what can be compared to a filing action. Preferably, a low viscosity lubricant, such as water, is caused to flow over the workpiece in the area of the cutting elements during a severing operation.

BACKGROUND OF THE INVENTION

While not limited thereto, the present invention is particularly adapted for use in cutting workpieces formed from strands of glass fibers bonded together by a suitable resin. In the usual manufacture of such workpieces, the glass fibers are saturated with a resin and caused to continuously pass through a die assembly where the resin is cured under the influence of heat. The resulting product is in the form of a rod or bar which can then be cut into lengths which are used as electrical insulators or the like.

In the past, it has been the practice to bundle a number of elongated workpieces of this type and cut them together by means of an abrasive wheel, such as the abrasive wheel of a mason's saw used to cut bricks and other similar articles. While this procedure will cut the workpieces, it has been found that the ends of the resulting cut lengths become frayed. This is due to the fact that the workpiece is formed from glass fibers; and there is a tendency to tear the individual, brittle fibers loose from the resin bonding material as the abrasive wheel passes through the workpiece. In this respect, any type of serrated cutting tool, such as a saw, will tend to accentuate this effect. Furthermore, when an attempt is made to cut such workpieces in a bundle, the individual workpieces are not held securely, particularly near the periphery of the bundle; and this aggravates the fraying problem.

SUMMARY OF THE INVENTION

As an overall object, the present invention seeks to provide new and improved apparatus for severing workpieces formed from glass fibers and the like bonded together by a bonding agent.

More specifically, an object of the invention is to provide apparatus of the type described which will cut workpieces formed from resin-bonded glass fibers without causing ragged or frayed edges adjacent the cut.

Still another object of the invention is to provide severing apparatus for glass fiber rods in which severing occurs by contact of a roughened but not serrated surface of a cutting element with the rod whereby severance occurs through what might be compared to a filing action rather than a sawing or cutting action.

In accordance with the invention, there is provided a pair of supporting members by which a workpiece is supported for a cutting operation and separated by a space through which a cutting element can pass to sever a workpiece supported on the supporting members. Preferably, these supporting members are aligned tubular members; however this is not necessarily the case. A head member rotates about one of the tubular members and carries at least one cutting element reciprocable inwardly or outwardly with respect to a workpiece carried by the supporting members. The cutting element is provided with a roughened, unserrated cutting surface. As the head is caused to rotate, a lever, preferably operable under the effect of centrifugal force, forces the cutting element radially inwardly as the head member rotates whereby the roughened cutting surface engages the workpiece to sever the same.

It has been found that in order to provide a high quality cut, a low viscosity lubricant, such as water, should flow over the cutting area. Accordingly, water is introduced into the tubular supporting member around which the cutting head rotates such that the water will flow through the tubular member and onto the workpiece at the cutting area. Furthermore, it has been found that in order to provide a satisfactory cut, the workpiece should be held against rotation during the cutting operation. Accordingly, means are provided in association with each one of the supporting members for applying a slight clamping force to the workpiece which is sufficient to prevent it from rotating during a cutting operation.

The above and other objects and features of the invention will become apparent from the following detailed description taken in connection with the accompanying drawings which form a part of this specification, and in which:

FIG. 1 is a perspective view of a workpiece of the type which is to be severed with the apparatus of the invention;

FIG. 2 is a schematic illustration of the manner in which the workpiece of FIG. 1 is formed;

FIG. 3 is an elevational cross-sectional view of the severing apparatus of the present invention;

FIG. 4 is a forward end view of the cutting head of the severing apparatus of the invention taken substantially along line IV—IV of FIG. 3;

FIG. 5 is a rear view of the cutting head of FIG. 4 taken along line V—V of FIG. 3;

FIGS. 6 and 7 illustrate the cutting element utilized by the severing apparatus of the invention;

FIG. 8 illustrates the manner in which the abrading or cutting surface of the cutting element of the invention is formed;

FIG. 9 is a cross-sectional view taken along line IX—IX of FIG. 3 showing one of the hold-down devices of the invention for preventing rotation of the workpiece; and FIG. 10 illustrates a unique product which may be manufactured in accordance with the invention by timing the duration of the severing operation with the apparatus of FIG. 3.

With reference now to the drawings, and particularly to FIG. 1, the workpieces to be cut with the apparatus of the invention comprises a plurality of strands of glass fibers 10 which are impregnated with a resin, preferably a thermosetting resin, and pulled through a die to form a rod, bar or other cross-sectional shape. The resulting product, as shown in FIG. 1, comprises a bar 12 in which the glass fibers are all closely packed and held together by means of the cured resin. Such bars can be used as electrical insulating pins in the construction of motors and other electrical devices.

Apparatus for forming the product of FIG. 1 is shown schematically in FIG. 2 and includes a die and curing assembly 14 into which the glass fibers 10 are continuously fed after passing through an unpolymerized resin bath, in the form of a liquid. After the loose glass fibers are impregnated with the resin and pulled through the die, heat is applied to the die as indicated by the arrows 18 to cure the resin, the resulting product emerging as the bar 12, for example.

The process for forming the resin impregnated fiber product is continuous; and it, therefore, becomes necessary to cut the product into selected lengths. As was mentioned above, it has been common to bundle a number of the thus-formed rods 12 and cut them with an abrasive saw. The difficulty with this method, however, is that the glass fibers, adjacent the periphery of the cut, tend to become frayed. This is perhaps due to the fact that they are formed from glass and are brittle; and when any attempt is made to cut the fibers as with a serrated or even relatively rough cutting edge, the fraying effect mentioned above results.

The apparatus of the present invention for severing a bar, such as the bar 12, is shown in FIGS. 3, 4 and 5. It includes a pair of supporting members 20 and 22 separated by a space 25 therebetween. The supporting members 20 and 22, which are in the form of tubes in the embodiment shown in FIGS. 3–5, are stationary. That is, neither one rotates. Passed through the tubular supporting members 20 and 22 is the rod 12 formed from resin-impregnated glass fibers. Surrounding the tubular supporting member 20 is a coaxial tubular member 24 connected to the armature 26 of a magnetic clutch, generally indicated by the reference numeral 28. Thus, as the armature 26 rotates, so also will be tubular member 24 connected thereto.

The magnetic clutch 28 is provided with a first coil 30 and a second coil 32. The coil 32 is non-rotatable such that when the armature 26 is attracted thereto, the armature and the tubular member 24 will be locked against rotation. The other coil 30 is connected through a tubular member 34 to a sheave or pulley 36 connected through belt 38 and pulley 40 to a drive motor 42. With this arrangement, the motor 42, pulley 36, tubular member 34 and coil 30 will continuously rotate; and whenever the armature 26 is attracted by the coil 30, it also will rotate. However, when the coil 30 is deenergized and coil 32 is energized, the armature 26 will be locked against rotation.

Carried on the end of the tubular member opposite the armature 26 is a cutting head, generally indicated by the reference numeral 44. It includes a block 46 having a back plate 48 secured thereto by means of bolt 50 (FIG. 5). The backing plate 48 is split as at 52 and provided with a tightening bolt 54 whereby the block 46 and backing plate 48 may be passed over the tubular member 24 and the bolt 54 tightened to securely clamp the tube to the member 24 and, hence, to the rotatable armature 26. Formed in the forward face of the block 46 are upper and lower slots 56 and 58 which receive cutting elements 60 for radial, reciprocating motion.

The cutting elements 60 are normally urged radially outwardly by means of a pair of elastic bands 62 (FIG. 4); however springs or other similar resilient devices may be employed for this purpose, as will be understood. Bolted onto the forward face of the block 46 are plates 64 and 66 which hold the cutting elements 60 within their associated slots 56 and 58. Formed at opposite ends of the block 46 are slots 68 and 70 (FIG. 3) through which pins 72 pass. Pivotally mounted on the pins 72, in turn, are lever arms 74 and 76. The lever arm 74 engages the end of one of the cutting elements 60; while the lever arm 76 engages the end of the other cutting element 60. Upon rotation of the block 46, centrifugal force will cause the lever arms 74 and 76 to move radially outwardly into the position shown by the dotted lines in FIG. 3, for example, thereby forcing the cutting elements 60 radially inwardly and into engagement with the workpiece 12. The cutting elements 60 are shown in detail in FIGS. 6 and 7 and include a block 78 which fits into slot 56 or 58. At one end of the block 78 is a slot 80 which receives a tungsten carbide cutting bit 82 provided with an abrading or cutting surface 84. The cutting surface 84 is not serrated, but is roughened slightly by means of an electric arc process, schematically shown in FIG. 8.

With reference to FIG. 8, the bit 82 is connected to one terminal of a power source 87 while the other terminal of the same power source is connected to an electrode 86. The resulting arcing between the electrode 86 and the cutting surface 84 pits the same, thereby providing a hard, roughened surface. As this hard, roughened surface engages the workpiece 12 with the head 44 rotating, it begins to cut the workpiece in what can be compared to a gentle filing action. In order to effectively cut the workpiece, the cutting area must be lubricated with a low-viscosity liquid. For this purpose, water is introduced into the tubular supporting member 20 through conduit 88. The workpiece 12 passes through an O-ring seal 89 such that the water is forced to flow to the left as viewed in FIG. 3 and onto the cutting area between the cutting elements 60. In order to provide a non-frayed end, the surface 84 should have a roughness of at least 10 microinches and no greater than 30 microinches.

In order to effectively cut the workpiece 12, it must be restrained against rotation. For this purpose, hold-down devices 90 and 92 are provided. The hold-down device 92 is exemplary and is shown in FIG. 9. It includes a bar 95 pivotally connected to an upright plate 94 at 96 and adapted to engage the workpiece 12 through an opening or slot 98 in the tubular member 20. Similarly, the bar 95 for the hold-down device 90 extends through an opening or slot 100 in the tubular supporting member 22.

In the operation of the invention, the two coils 30 and 32 are connected to a control circuit 102 coupled to a timer 104. Normally, coil 32 will be energized by the control circuit 102 and will attract the armature 26 thereto, thereby locking the armature, the tubular member 24, and the cutting head 44 against rotation. During this time, the workpiece 12 is advanced through the tubular member 20 and tubular member 22 to a stop member, not shown. Thereafter, the timer 104 is set to cause the control circuit 102 to deenergize coil 32 and energize coil 30 for a predetermined period of time. When coil 30 is energized and the armature 26 attracted to it, the armature and the cutting head begin to rotate, thereby throwing the lever arms 74 and 76 radially outwardly and forcing the cutting elements 60 radially inward whereby the roughened surfaces 84 engage and cut through the workpiece 12 with the water from inlet 88 flowing across the cutting area. The timer 104 then deenergizes coil 30 and again energizes coil 32 after the workpiece has been completely severed. This period of time, of course, will depend upon the thickness and other characteristics of the workpiece being severed.

The use of a timer such as that shown in FIG. 3 enables the apparatus of the invention to produce a product such as that shown in FIG. 10. It comprises a central copper or the like conductor 106 surrounded by a sheaf of glass fibers embedded in a cured resin and formed in much the same way as the product of FIG. 1 except that the center conductor 106 is fed into the die along with the surrounding glass fibers. By passing the resulting product through apparatus such as that shown in FIG. 3, and by setting the timer 104 such that the cutting elements 60 will cut down only to the center conductor 106, a product is formed comprising a glass-insulated conductor having spaces 108 along its length for connection to other circuits or circuit elements.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In apparatus for severing workpieces formed from a plurality of glass fibers bonded together by a bonding agent, the combination of a pair of supporting members by which a workpiece is supported for a cutting operation and separated by a space through which a cutting element can pass to sever a workpiece supported on the supporting members, a head member rotatable about at least one of said supporting members, at least one cutting element carried by said head member and reciprocable inwardly with respect to a workpiece carried by said supporting members, said cutting element having a roughened, unserrated cutting surface which engages said workpiece during a cutting operation, the cutting surface being essentially flat, and means for forcibly moving said cutting element radially inwardly as the head member rotates whereby said roughened cutting surface will engage said workpiece to sever the same.

2. The combination of claim 1 wherein at least one of said supporting members is tubular and said head member rotates around the one tubular member.

3. The combination of claim 1 wherein both of said supporting members are tubular in configuration.

4. The combination of claim 1 including means for causing a lubricant to flow over said workpiece in the area at which said cutting element engages the workpiece.

5. The combination of claim 4 wherein said lubricant is water.

6. The combination of claim 2 wherein a lubricant is caused to flow through said tubular member and onto said workpiece at the area severed by said cutting element.

7. The combination of claim 1 including means for restraining said workpiece during a severing operation.

8. The combination of claim 1 wherein there is a plurality of cutting elements carried by said head member.

9. The combination of claim 1 wherein said cutting element is forced radially inwardly by centrifugal force as said head member rotates.

10. The combination of claim 9 wherein said cutting element is carried in a radially extending slot formed in said head member, an element pivotally carried on said head member and engaging the radially outermost end of said cutting element whereby rotation of the head member will cause said last-named element to rotate about its pivotal connection to the head member and force said cutting element radially inwardly, and resilient means urging said cutting element radially outwardly.

References Cited

UNITED STATES PATENTS

| | | | |
|---|---|---|---|
| 2,239,755 | 4/1941 | Montgomery | 82—70.2X |
| 3,024,687 | 3/1962 | Brownstein | 82—59 |
| 3,108,819 | 10/1963 | McKay | 82—47X |
| 3,118,333 | 1/1964 | Pilcher II et al. | 82—47 |
| 3,129,621 | 4/1964 | Makowski | 82—59 |
| 3,138,308 | 6/1964 | Oakley | 82—47X |
| 3,382,747 | 5/1968 | Breher | 82—59 |

FOREIGN PATENTS

| | | | |
|---|---|---|---|
| 1,116,961 | 11/1965 | Great Britain | 82—60 |

HARRISON L. HINSON, Primary Examiner